Figure 1:
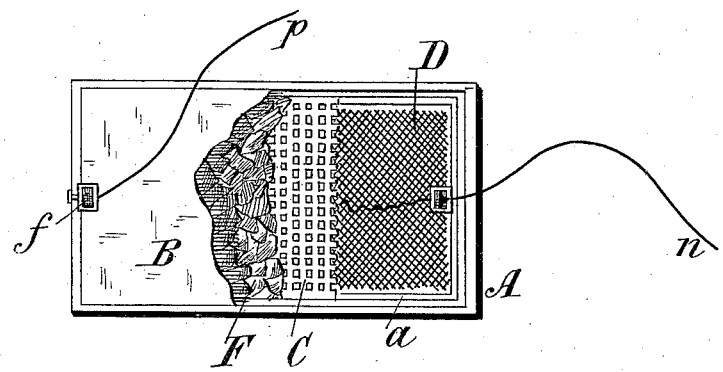
Figure 2:
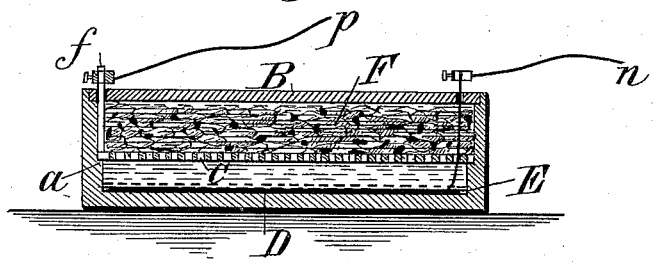

(No Model.)

A. S. HICKLEY.
SECONDARY BATTERY.

No. 307,461. Patented Nov. 4, 1884.

WITNESSES:
L. W. Seely
W. E. Chaffee

INVENTOR,
A. S. Hickley,
BY R. A. Kellow
ATTORNEY (No Model.)
A. S. HICKLEY & W. S. HILL.
SECONDARY BATTERY.
No. 307,462. Patented Nov. 4, 1884.
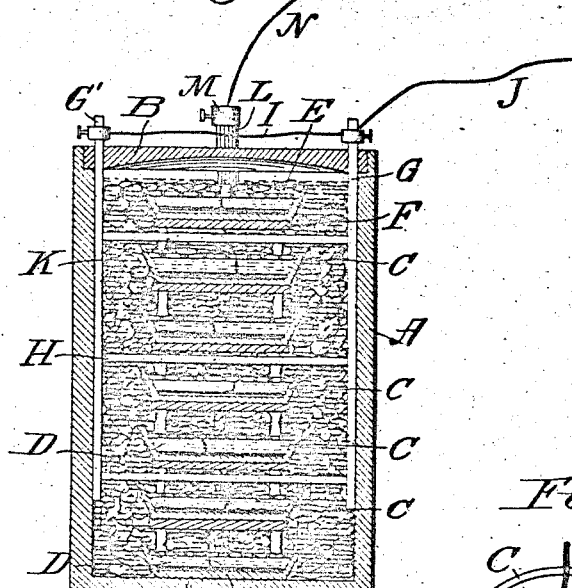
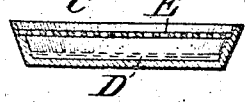
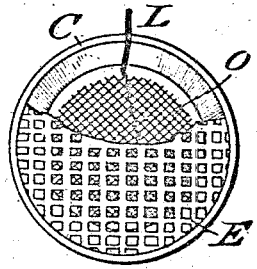
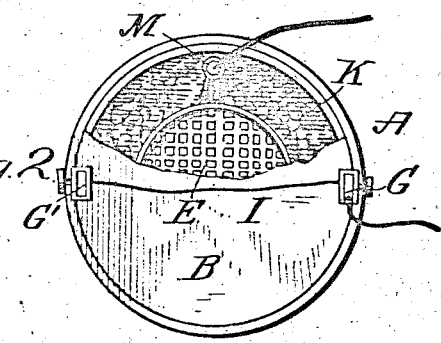
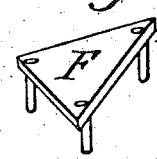
WITNESSES:
INVENTORS: